United States Patent [19]

Schortmann

[11] Patent Number: 5,204,165
[45] Date of Patent: Apr. 20, 1993

[54] NONWOVEN LAMINATE WITH WET-LAID BARRIER FABRIC AND RELATED METHOD

[75] Inventor: Walter E. Schortmann, Cumberland, R.I.

[73] Assignee: International Paper Company, Purchase, N.Y.

[21] Appl. No.: 748,298

[22] Filed: Aug. 21, 1991

[51] Int. Cl.$^5$ ............................................. B32B 27/14
[52] U.S. Cl. .................................. 428/198; 156/73.1; 156/290; 156/306.6; 156/308.2; 428/284; 428/286; 428/287; 428/296; 428/297; 428/298; 428/326; 428/421; 428/422; 428/913; 428/171; 428/172
[58] Field of Search ............... 428/198, 284, 286, 287, 428/296, 297, 298, 326, 421, 422, 913, 171, 172; 156/73.1, 290, 306.6, 308.2

[56] References Cited

U.S. PATENT DOCUMENTS

| | | | |
|---|---|---|---|
| 3,327,708 | 6/1967 | Sokolowski | 128/156 |
| 3,485,705 | 12/1969 | Harmon | 161/59 |
| 3,649,428 | 3/1972 | Hughes | 161/50 |
| 3,695,985 | 10/1972 | Brock et al. | 161/129 |
| 3,795,571 | 3/1974 | Prentice | 161/148 |
| 3,837,995 | 9/1974 | Floden | 161/150 |
| 4,012,281 | 3/1977 | Mayer et al. | 428/198 |
| 4,041,203 | 8/1977 | Brock et al. | 428/157 |
| 4,196,245 | 4/1980 | Kitson et al. | 428/198 |
| 4,287,251 | 9/1981 | King et al. | 428/198 |
| 4,302,496 | 11/1981 | Donovan | 428/198 |
| 4,331,730 | 5/1982 | Sorenson | 428/286 |
| 4,374,888 | 2/1983 | Bornslaeger | 428/198 |
| 4,425,126 | 1/1984 | Butterworth et al. | 604/366 |
| 4,521,477 | 6/1985 | Kiss | 428/282 |
| 4,555,811 | 12/1985 | Shimalla | 2/51 |
| 4,565,736 | 1/1986 | Stein et al. | 428/286 |
| 4,587,154 | 5/1986 | Hotchkiss et al. | 428/195 |
| 4,605,454 | 8/1986 | Sayovitz et al. | 156/73.1 |
| 4,657,804 | 4/1987 | Mays et al. | 428/296 |
| 4,659,614 | 4/1987 | Vitale | 428/218 |
| 4,684,570 | 8/1987 | Malaney | 428/296 |
| 4,692,368 | 9/1987 | Taylor et al. | 428/137 |
| 4,705,712 | 11/1987 | Cashaw et al. | 428/152 |
| 4,775,579 | 10/1988 | Hagy et al. | 428/284 |
| 4,784,892 | 11/1988 | Storey et al. | 428/198 |
| 4,844,965 | 7/1989 | Fryman | 428/198 |
| 4,863,785 | 9/1989 | Berman et al. | 428/296 |
| 5,035,943 | 7/1991 | Kinlow et al. | 428/296 |

FOREIGN PATENT DOCUMENTS 8705952 10/1987 PCT Int'l Appl.

Primary Examiner—James J. Bell
Attorney, Agent, or Firm—Ostrager, Chong & Flaherty

[57] ABSTRACT

A nonwoven laminate, having a barrier property, is made of at least one thermoplastic fiber layer bonded with a wet-laid fabric layer, made of a uniform distribution of cellulose fibers, polymeric fibers, and a binder, which is treated with a water-repellent finish. Alternatively, the wet-laid fabric layer can be made without the addition of any binders to form a tissue-type core fabric layer. In a preferred form, spunbond polyester fiber layers are ultrasonically bonded on each side of a wet-laid barrier fabric made of about 20% eucalyptus pulp, 45% staple polyester fibers of 1.5 denier, and 35% polyester fibers of finer denier of about 0.6 denier, which is bonded with an acrylic latex binder and treated with a water-repellent finish that includes a fluorocarbon compound. The resulting laminate has a desired drapability and soft hand. Combined with the low unit cost, air permeability and water-resistant barrier properties, the wet-laid barrier fabrics of the invention are suitable for industrial, hospital, and other protective or covering uses.

30 Claims, 2 Drawing Sheets

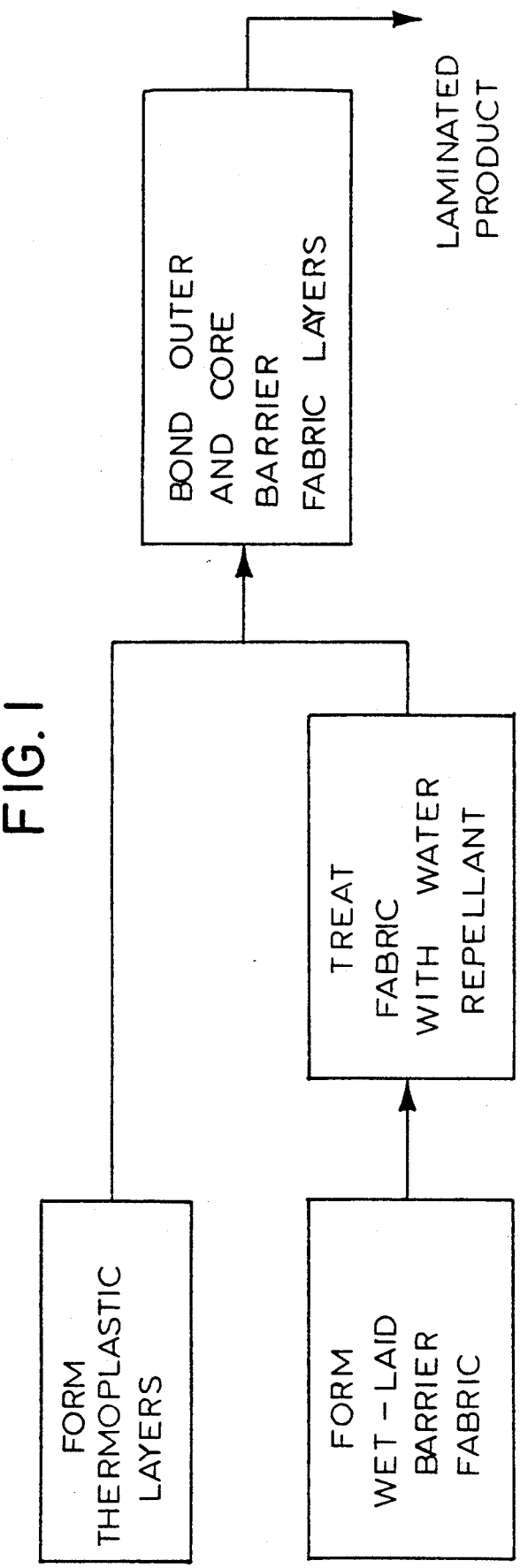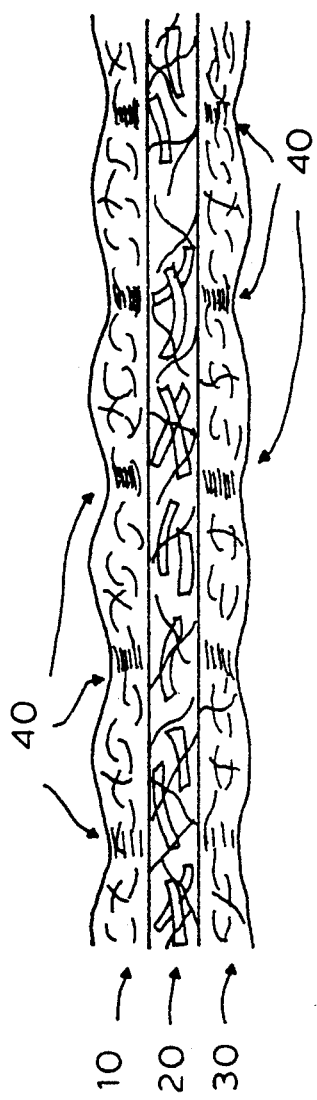

NONWOVEN LAMINATE WITH WET-LAID BARRIER FABRIC AND RELATED METHOD

FIELD OF THE INVENTION

This invention generally relates to a nonwoven laminate having a barrier property and a related method of making the same. More particularly, it concerns a nonwoven laminate comprised of at least one layer of thermoplastic fibers bonded to a wet-laid fabric layer. The barrier fabrics of the invention have a high resistance to water penetration while maintaining air permeability.

BACKGROUND ART

Barrier fabrics and laminates are used in protective industrial outerwear, lab coats, hospital gowns, drapes, wraps, bandages, and other uses requiring a strong, breathable, drapable and hydrophobic fabric. In the prior art, for example, as disclosed in U.S. Pat. No. 4,041,203 to Brock et al., nonwoven laminates have been formed by fuse-bonding one or more layers of spunbond fibers, i.e., extruded thermoplastic fibers of short length and small diameter, with a barrier fabric layer made of continuous thermoplastic filaments. Typically, the continuous filament web is made by extruding thermoplastic polymer to form discrete continuous filaments, and air-laying the filaments in a random, inter-entangled manner on a carrier wire or belt. The spunbond layer or layers are then bonded to the continuous filament web at discrete bonding points by application of heat and pressure.

Other nonwoven laminates, such as shown in U.S. Pat. Nos. 4,657,804 to Mays et al. and 4,684,570 to Malaney, employ a carded or air-laid fabric layer of conjugate bi-component fibers treated with a water-repellent finish. However, such laminates have a relatively high per unit cost, and their water resistance can be relatively low for a given level of air permeability. Wet-laid fabric layers, particularly those employing cellulose fibers treated with a water-repellent finish, have good water repellency and barrier qualities, but are generally viewed as not being bondable to a thermoplastic spunbond layer.

SUMMARY OF THE INVENTION

Accordingly, it is a principal object of the invention to provide a nonwoven laminate with a barrier fabric layer which has good strength, water-repellency, drapability, and air permeability yet is inexpensive to produce. It is a particular object of the invention that such a laminate have a high resistance to water penetration and good barrier properties while maintaining air permeability.

In accordance with the invention, a nonwoven laminate having a barrier property comprises at least one fiber layer made of thermoplastic fibers, and a wet-laid fabric layer made of a uniform distribution of cellulose fibers, polymeric fibers, and a binder, wherein a water-repellent finish is applied to the wet-laid fabric layer, and wherein at least one thermoplastic fiber layer and the wet-laid fabric layer are bonded together at a plurality of discrete bonding points.

For preferred materials, the thermoplastic fiber layer is a spunbond layer of polyester or polypropylene fibers of textile diameter, the wet-laid fabric layer comprises in the range of 20% to 60% cellulose fibers and about 40% or more of the fiber content is polyester fibers which are bonded together with an acrylic latex binder. The water-repellent finish includes a fluorocarbon compound. The thermoplastic fiber layer and the wet-laid fabric layer are bonded together by ultrasonic bonding, or also by thermal bonding. One preferred wet-laid fabric layer has 60% eucalyptus pulp and 40% polyester fibers of 1.5 denier and 0.5 inch length. Another fabric layer embodiment has 20% eucalyptus pulp, 50% polyester fibers of 1.5 denier and 0.5 inch length, and 30% polyester fibers of finer denier (e.g., 0.6 denier). A third fabric layer embodiment has 20% eucalyptus pulp and 80% polyester fibers of the finer denier. The preferred laminate product has two external layers of spunbond thermoplastic fibers with a core wet-laid fabric layer bonded in between them, although for some applications only one spunbond layer may be all that is needed.

The invention further includes the method of making a nonwoven laminate having a barrier property comprising the steps of forming at least one fiber layer made of thermoplastic fibers, forming a wet-laid fabric layer made of a uniform distribution of cellulose fibers, polymeric fibers, and a binder, applying a water-repellent finish to the wet-laid fabric layer, and bonding said at least one thermoplastic fiber layer and the wet-laid fabric layer together at a plurality of discrete bonding points. The method encompasses the use of the above-mentioned preferred materials and layer compositions, and uses ultrasonic bonding to bond the layers together. The wet-laid fabric layer may also be mechanically or chemically softened before bonding.

In an alternate embodiment of the invention, the wet-laid fabric layer is made of a uniform distribution of cellulose and polymeric fibers without the addition of any binders. In this embodiment the cellulose and polymeric fibers are treated with the water-repellent finish to form a tissue-type core fabric layer.

Other objects, features, and advantages of the present invention will become apparent from the following detailed description of the best mode of practicing the invention when considered with reference to the drawings, as follows:

BRIEF DESCRIPTION OF THE DRAWINGS

FIG. 1 is a schematic diagram of the production steps for making a preferred embodiment of the nonwoven laminate having a barrier property in accordance with the invention;

FIG. 2 is a side sectional diagram of the nonwoven laminate as produced according to FIG. 1;

BEST MODE OF CARRYING OUT THE INVENTION

Figure 3:
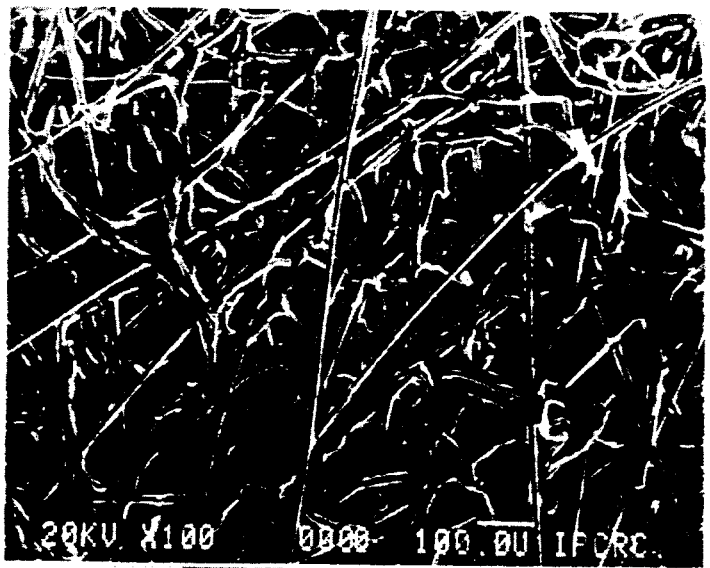
FIG. 3 is a photomicrograph of the core fabric layer of an SLS barrier fabric of the invention at 100× magnification in accordance with Example III.

Referring to FIG. 1, the production steps for making the nonwoven laminate having a barrier property in accordance with the invention include: (1) forming one or more layers of thermoplastic fibers via spunbonding; (2) separately forming a fabric layer by the wet-laid process made of a uniform distribution of cellulose fibers, polymeric fibers, and a binder; (3) applying a water-repellent finish to the wet-laid fabric layer; (4) combining at least one thermoplastic fiber layer and the finish-treated wet-laid fabric layer; and (5) ultrasonically or thermally bonding the layers together at a plurality of discrete, distributed bonding points.

In an alternate embodiment of the invention, the wet-laid fabric layer is made of a uniform distribution of cellulose and polymeric fibers without the addition of any binders. In this embodiment the cellulose and polymeric fibers are treated with the water-repellent finish to form a tissue-type core fabric layer.

In FIG. 2, the resulting nonwoven laminate product is shown in cross-section having a first thermoplastic fiber layer 10, a core barrier fabric layer 20, and a second thermoplastic fiber layer 30 bonded at evenly distributed bonding points 40.

In a preferred form of the invention, polyester or polypropylene fibers of small diameter (average diameter of 1.5 to 10 denier) are extruded upon a screen to form the thermoplastic fiber layers used on each side of the core wet-laid fabric layer, which is sandwiched in between them. However, the laminate may have the thermoplastic fiber layer on only one side of the wet-laid fabric layer, and the thermoplastic fiber layer may be made by regular carded, carded and air laid, wet laid, chemically bonded or hydroentangled, or other type of web formation and bonding methods. The thermoplastic fibers may be any suitable polymer or copolymer, such as of polyester, polyethylene, polypropylene, ethylene/propylene, ethylene/vinyl acetate, chlorinated polyethylene, polyvinyl chloride, or polyamide.

The core wet-laid fabric layer is made of a uniform distribution of cellulose fibers and polymeric fibers bonded together with a binder. At least 20% cellulose fibers is needed to form a suitable web by the wet-laid process. The cellulose fibers provide a greater density in the wet-laid web which enhances its resistance to water penetration and other barrier properties, as compared to an air-laid thermoplastic fiber web, e.g., a spun-bonded web. About 40% or more of the fibers are polymeric in order to obtain suitable qualities of drape and a soft hand, and to provide bonding points for bonding the fabric layer to the thermoplastic fiber layers. The preferred fabric layer contains eucalyptus pulp and staple polyester fibers of 1.5 denier and 0.5 inch length. It may also contain polyester fibers of fine (about 0.5) denier to enhance the drape and softness of the core layer.

The conventional wet laid process begins with stock preparation to make an evenly dispersed mixture of the polymeric and cellulose fibers. Typically, wood fiber is received in sheet form called dry lap. These sheets are broken up in a slurry tank fitted with a rotor, then the wood fiber slurry is passed through a refiner. The polymeric fibers are opened (separated) and dispersed with the pulp fibers in a mix tank. Dispersion can be aided by chemical addition, pH adjustment or viscosity modifiers to promote and maintain fiber separation. Wetting agents can also be employed to facilitate dispersion of the hydrophobic fibers. The mix tank is equipped with an agitator which provides the shear energy required to effect good fiber separation and dispersion throughout the mix volume.

The required water, chemicals, and fibers are added to the mixing tank in controlled amounts to obtain a desired stock consistency. The stock furnish is then fed to a forming machine where it is spread evenly on an endless wire or mesh moving in a "machine" direction (MD). The "cross" direction (CD) is across the width of the wire. In the forming zone, water from the dilute stock is drawn through the wire, leaving behind a fiber mat or sheet. A press section may follow the forming machine to remove additional water from the mat as well as to consolidate the web.

A binder is added to the formed web by any one of several methods, including foamed emulsion, gravure roll polymer emulsion, spraying, or padding and nip-pressure binder pick-up. The binder-impregnated sheet is then dried through a drying section, which may include air convection driers, steam heated dry cans, or radiant heat from infrared heat panels. Sufficient heat is applied to remove the water from the binder emulsion and cause bonding together of the fibers. A preferred binder material is acrylic latex emulsion, such as E-940, sold by Rolm & Haas. Other binders which can be used include polyvinyl acetate, methyl and/or ethyl acrylate homopolymers and copolymers, and styrene-butadiene copolymers.

The dried and bonded mat is then treated with an aqueous padding mix containing a water-repellent finish, such as a fluorocarbon compound to obtain a high contact angle. An example of a suitable fluorocarbon compound is FC-824 sold by 3M Company. Other water-repellent compounds may be used instead or in combination with the fluorocarbon compound, including wax emulsions such as Aerotex 96B sold by American Cyanimid, and silicones. An anti-static agent, such as Siligen APE, a quaternary amine compound sold by BASF Company, may also be added. The padding mix is mixed in batches and then supplied to a dip bath in which the wet-laid fabric mat is continuously immersed. Excess padding mix is removed by a squeeze padder with a suitable squeeze pressure, for example, about 25 psig for process speeds of about 150 ft/min. The wet pick-up is about 100%, and the resulting fabric layer is finished with a smooth surface.

The spunbond layers and the finished wet-laid fabric layer are combined and bonded together by ultrasonic bonding, in which the layers are passed between an ultrasonic horn and a patterned drum having raised points for focusing the ultrasonic wave energy. Other bonding techniques, such as hot calendering, chemical bonding, and stitch bonding, may also be used.

In an alternate embodiment of the invention, no binder is added to the wet-laid web. In this embodiment the cellulose and polymeric fibers are treated with the water-repellent finish containing a fluorocarbon compound to form a tissue-type core fabric layer. The spunbond layers and this wet-laid fabric layer are combined and bonded together by ultrasonic bonding or other bonding techniques stated above. The resulting barrier fabric has increased softness and is impermeable to water penetration but allows air permeability.

In the following examples, barrier fabrics of the invention were produced by the process line as shown in FIG. 1. The thermoplastic fiber layers were formed using spunbond polyester fibers. In Examples I–III, the core fabric layer was a wet-laid web made of a uniform distribution of cellulose fibers, polymeric fibers and a binder. In Examples IV–VI, the core fabric layer was a wet-laid web made of the same materials without the addition of any binders. In all the examples, the wet-laid fabric layer was treated with an aqueous padding mix, containing a water-repellant finish. Thereafter, the fiber layers and the treated fabric layer were combined and were ultrasonically or thermally bonded together to form a barrier fabric of the invention.

In this specification the term SLS refers to a nonwoven laminate in which the fiber layers are spunbond and the fabric layer is comprised of an acrylic-latex bonded wet-laid cellulose polyester web having high water repellency. The term STS refers to a nonwoven laminate in which the fiber layers are spunbond and the fabric layer is comprised of a wet-laid cellulose polyester web, without any binder. The fabric layer in the STS barrier fabrics are treated with a water-repellent finish, containing a fluorocarbon compound, to form a tissue-type core fabric layer.

Examples I and II show production and properties of SLS barrier fabrics of the invention. Example II shows production and properties of a SLS barrier fabric in which the core fabric layer has been mechanically softened. Examples IV, V and VI show production and properties of STS barrier fabrics of the invention in which no binder has been added to the core fabric layer. The Mullen Burst, Air Permeability, Hydrostatic Head, Mason Jar, Water Impact, Drape Stiffness, and Hand tests referred to below are all standard tests used in the fabric industry. These examples set forth below are merely representative and are not inclusive of all the possible embodiments of the invention.

TABLE I

| Example I - (SLS) | |
| --- | --- |
| Fiber Layers: | two layers, 17 gsy spunbond polyester fibers |
| Fabric Layer: | 60% eucalyptus pulp with binder<br>total weight: 31 gsy |
| Padding Mix: | 2% mixture of fluorocarbon, wax emulsion and anti-static agent<br>98% water |

| COMPARATIVE PROPERTIES OF<br>SLS BARRIER FABRIC OF EXAMPLE I | |
| --- | --- |
| PROPERTY | SLS OF EXAMPLE I |
| AIR PERMEABILITY (cu ft/sq ft/min) | 60.0 |
| HYDROSTATIC HEAD (inch) | 14.0 |

TABLE II

| Example II - (SLS) | |
| --- | --- |
| Fiber Layers: | two layers, 17 gsy spunbond polyester fibers |
| Fabric Layer: | 60% eucalyptus pulp with binder<br>total weight: 42 gsy |
| Padding Mix: | 2% mixture of fluorocarbon, wax emulsion and anti-static agent<br>98% water |

| COMPARATIVE PROPERTIES OF<br>SLS BARRIER FABRIC OF EXAMPLE II | |
| --- | --- |
| PROPERTY | SLS OF EXAMPLE II |
| AIR PERMEABILITY (cu ft/sq ft/min) | 46.0 |
| HYDROSTATIC HEAD (inch) | 19.0 |

TABLE III

| Example III - (SLS) | |
| --- | --- |
| Fiber Layers: | two layers, 17 gsy spunbond polyester fibers |
| Fabric Layer: | 40% staple polyester, 1.5 denier, 1.6 inch length<br>60% eucalyptus pulp<br>acrylic latex binder, 23% of weight of fibers<br>total weight: 40 gsy |
| Padding Mix: | 2% mixture of fluorocarbon, wax emulsion and anti-static agent<br>98% water |

| COMPARATIVE PROPERTIES OF SLS BARRIER FABRIC OF EXAMPLE III | | |
| --- | --- | --- |
| | SLS (FABRIC LAYER MECHANICALLY SOFTENED) | SLS (FABRIC LAYER ONLY (UN-SOFTENED) |
| PROPERTY | | |
| UNIT WEIGHT (gsy) | 77.85 | 39.2 |
| THICKNESS (mils) | 16.9 | 5.18 |
| MD GRAB TENSILE DRY (lbs) | 22.2 | 15.0 |
| CD GRAB TENSILE DRY (lbs) | 17.6 | 13.4 |
| MD ELONGATION (%) | 31.3 | 15.0 |
| CD ELONGATION (%) | 78.0 | 21.0 |
| MULLEN BURST (psi) | 35.0 | 35.3 |
| AIR PERMEABILITY (cu ft/sq ft/min) | 23.16 | 19.3 |
| HYDROSTATIC HEAD (inch) | 15.78 | 13.31 |
| MASON JAR TEST (min) | 90+ | 90+ |
| WATER IMPACT (gms thru fabric) | 0.17 | 0.13 |
| DRAPE STIFFNESS MD (cm) | 11.35 | — |
| DRAPE STIFFNESS CD (cm) | 8.65 | — |
| HAND-O-METER MD | 105.0 | — |
| HAND-O-METER CD | 74.7 | — |

TABLE IV

| Example IV - (STS) | |
| --- | --- |
| Fiber Layers: | two layers, 17 gsy spunbond polyester fibers |
| Fabric Layer: | 40% staple polyester<br>60% eucalyptus pulp<br>no binder<br>total weight: 27 gsy |
| Padding Mix: | 2% mixture of fluorocarbon, wax emulsion and anti-static agent<br>98% water |

| COMPARATIVE PROPERTIES OF<br>STS BARRIER FABRIC OF EXAMPLE IV | |
| --- | --- |
| PROPERTY | STS OF EXAMPLE IV |
| AIR PERMEABILITY (cu ft/sq ft/min) | 87 |
| HYDROSTATIC HEAD (inch) | 11.5 |
| HAND-O-METER MD | 80.4 |
| HAND-O-METER CD | 54.5 |

Compared to the barrier fabric produced in Example III, the barrier fabric of this example had a softer hand, higher air permeability, a good hydrostatic head and comparable laminate bond strength. The fabric layer in this example is of lower weight and less costly to produce due to the omission of binder compounds. Also, to simplify the process of the invention, the padding mix can be added to the fabric layer at the usual binder station, thus eliminating an additional treatment station.

TABLE V

| Example V - (STS) | |
| --- | --- |
| Fiber Layers: | two layers, 17 gsy spunbond polyester fibers |
| Fabric Layer: | 40% staple polyester<br>60% eucalyptus pulp<br>no binder<br>total weight: 33 gsy |
| Padding Mix: | 2% mixture of fluorocarbon, wax emulsion and anti-static agent<br>98% water |

| COMPARATIVE PROPERTIES OF<br>STS BARRIER FABRIC OF EXAMPLE V | |
| --- | --- |
| PROPERTY | STS OF EXAMPLE V |
| AIR PERMEABILITY (cu ft/sq ft/min) | 46.0 |
| HYDROSTATIC HEAD (inch) | 15.0 |

The resulting barrier fabric of this example exhibited comparable properties to Example IV.

TABLE VI

| Example VI - (STS) | |
| --- | --- |
| Fiber Layers: | two layers, 17 gsy spunbond polyester fibers |
| Fabric Layer: | 40% staple polyester |
| | 60% eucalyptus pulp |
| | no binder |
| | total weight: 28 gsy |
| Padding Mix: | DuPont fluorocarbon 6700 foamed with Dexter chemical agent |

| COMPARATIVE PROPERTIES OF STS BARRIER FABRIC OF EXAMPLE VI | |
| --- | --- |
| PROPERTY | STS OF EXAMPLE VI |
| AIR PERMEABILITY (cu ft/sq ft/min) | 62 |
| HYDROSTATIC HEAD (inch) | 9.0 |
| HAND-O-METER MD | 81.0 |
| CD | 52.0 |

The fabric layer in this example was of a tissue-type fabric with good air permeability and a soft hand but with lower tensile strength. The padding mix used in Example IV produced a slightly higher hydrostatic head than the fluorocarbon formulation of this example. Higher hydrostatic head results, i.e. 16 inches, were obtained by applying the DuPont fluorocarbon mix at a higher level.

In the above examples, the wet-laid barrier fabric containing cellulose and polymeric fibers were found to form a good bond to the thermoplastic spunbond layers. The cellulose fibers provided body and density, while the polymeric fibers provided bonding sites, drapability and softness to the barrier fabric. The tests of physical properties of the resulting laminate showed that the desirable barrier properties of the wet-laid fabric layer were retained. The hydrophobic fibers of the external spunbond layers added resistance to wetting and surface smoothness.

FIG. 3 is a photomicrograph at 100× magnification showing the structure of the core fabric layer of an SLS barrier fabric of the invention in accordance with Example III. As shown in this figure, the structure of the barrier fabric layer has an even distribution of cellulose and polymeric fibers bonded together with a binder creating small pore sizes which provide resistance to water penetration while maintaining air permeability. The pore sizes are controlled according to standard formulas taking into account the fiber dimensions.

Figure 4:
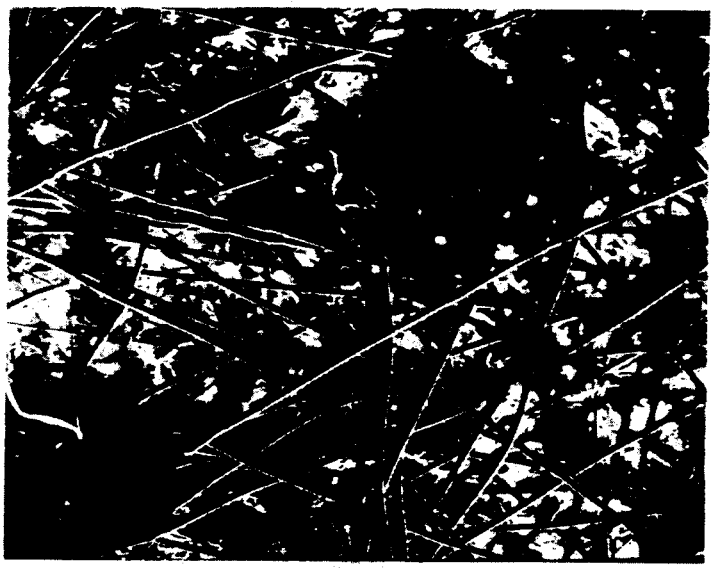
FIGS. 4 and 5 are photomicrographs of STS barrier fabrics of the invention at 50× and 100× magnification, respectively, in accordance with Example VI.
Figure 5:
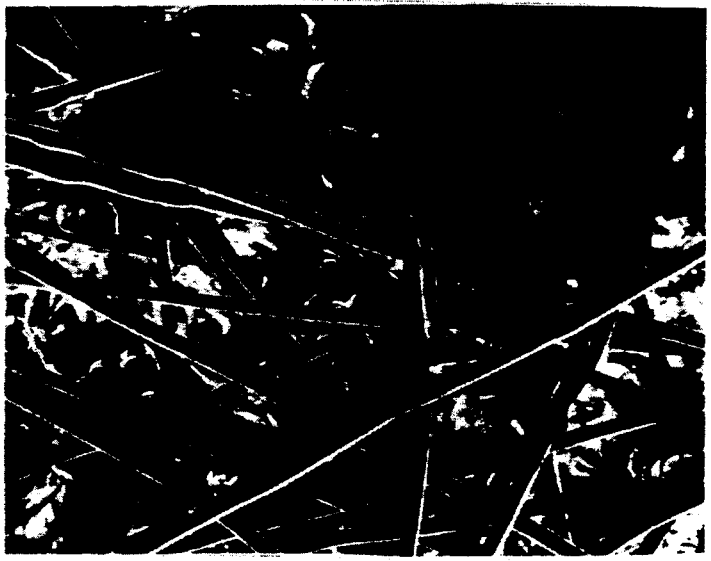

FIGS. 4 and 5 are photomicrographs at 50× and 100× magnification, respectively, showing the laminate structure of an STS barrier fabric of the invention in accordance with Example VI. As shown in these figures, the large elongated rods are the spunbond fibers of the fiber layer. The nodules indicate areas where the spunbond layer has been bonded with the core fabric layer. The core fabric layer of the STS barrier fabric is indicated by the appearance of flat "tissue-like", flaky fibers beneath the spunbond fibers. The SLS core fabric layer has a more cohesive appearance than the STS core fabric layer due to the presence of binder.

Other examples of the laminate structure of the invention with the combined spunbond and core fabric layers include: (1) fiber content of the wet-laid fabric layer comprising about 60% eucalyptus pulp and 40% polyester fibers of 1.5 denier and 0.5 inch length; (2) fiber content of the wet-laid fabric layer comprising about 20% eucalyptus pulp, 45% staple polyester fibers of 1.5 denier and 0.5 inch length, and 35% polyester fibers of finer denier in the range of about 0.6 denier; and (3) fiber content of the wet-laid fabric layer comprising about 20% eucalyptus pulp and 80% polyester fibers of finer denier in the range of about 0.6 denier. Similar improvements in the properties of such other laminates can be obtained as illustrated in Example III above. Examples IV, V and VI illustrate results obtained by omitting binder from the middle fabric layer.

Due to the carryover of the barrier properties of the core wet-laid fabric layer, the resulting nonwoven laminate product is a strong, water-repellent, breathable fabric which can be formed with a desired drape and soft hand suitable for use in a wide range of industrial, hospital, bandaging, and other uses. The unit cost of manufacture of the wet-laid barrier layer is greatly reduced, as compared to commercially available air-laid thermoplastic fabric, and thus significantly reduces the overall cost of the resulting laminate.

Numerous variations of the fiber compositions and materials from the examples given herein are of course possible in view of the above disclosure. Although the invention has been described with reference to certain preferred embodiments and process modes, it will be appreciated that other variations of structures, products, and processes may be devised, which are nevertheless considered to be within the spirit and scope of the invention as defined in the claims appended hereto.

I claim:

1. A nonwoven laminate having a barrier property comprising:
   at least one fiber layer made of thermoplastic fibers; and
   a wet-laid fabric core layer made of a uniform distribution of cellulose fibers and polymeric fibers;
   wherein a water-repellent finish is applied to said wet-laid fabric layer, and wherein said at least one thermoplastic fiber layer and said wet-laid fabric layer are bonded together at a plurality of discrete bonding points.

2. A nonwoven laminate according to claim 1, wherein a binder is added to said wet-laid fabric core layer.

3. A nonwoven laminate according to claim 1, wherein the thermoplastic fiber layer is made of spunbond fibers selected from the group consisting of polyester and polypropylene fibers.

4. A nonwoven laminate according to claim 1, wherein the wet-laid fabric layer comprises in the range of 20% to 60% cellulose fibers.

5. A nonwoven laminate according to claim 4, wherein the cellulose fibers are about 20% eucalyptus pulp.

6. A nonwoven laminate according to claim 1, wherein the polymeric fibers are polyester fibers making up about 40% or more of the fiber content of the wet-laid fabric layer.

7. A nonwoven laminate according to claim 6, wherein the polymeric fibers are about 45% staple polyester fibers of 1.5 denier and 0.5 inch length, and 35% polyester fibers of finer denier in the range of about 0.6 denier.

8. A nonwoven laminate according to claim 2, wherein said binder is an acrylic latex binder in an amount of about 20% or more of the weight of the wet-laid fabric layer.

9. A nonwoven laminate according to claim 1, wherein the water-repellent finish includes a fluorocarbon compound.

10. A nonwoven laminate according to claim 1, wherein the water-repellent finish includes a wax emulsion.

11. A nonwoven laminate according to claim 1, wherein fiber content of the wet-laid fabric layer comprises about 60% eucalyptus pulp and 40% polyester fibers of 1.5 denier and 0.5 inch length.

12. A nonwoven laminate according to claim 1, wherein the fiber content of the wet-laid fabric layer comprises about 20% eucalyptus pulp, 45% staple polyester fibers of 1.5 denier and 0.5 inch length, and 35% polyester fibers of finer denier in the range of about 0.6 denier.

13. A nonwoven laminate according to claim 1, wherein the fiber content of the wet-laid fabric layer comprises about 20% eucalyptus pulp and 80% polyester fibers of finer denier in the range of about 0.6 denier.

14. A nonwoven laminate according to claim 1, wherein two external layers of thermoplastic fibers are provided on each side of the wet-laid fabric core layer which is bonded in between them.

15. A nonwoven laminate according to claim 14, wherein the two external layers are made of spunbond fibers selected from the group consisting of polyester fibers and polypropylene fibers.

16. A nonwoven laminate according to claim 1, wherein said at least one thermoplastic fiber layer and said wet-laid fabric layer are ultrasonically bonded together.

17. A nonwoven laminate according to claim 1, wherein said at least one thermoplastic fiber layer and said wet-laid fabric layer are bonded together by hot calendering.

18. A nonwoven laminate having a barrier property comprising:
two external fiber layers each made of thermoplastic fibers; and
a core layer made of a uniform distribution of a fiber material having both the properties of air permeability and a barrier to water penetration;
wherein a water-repellent finish is applied to said core layer, and wherein said two external thermoplastic fiber layers and said core layer are bonded together at a plurality of discrete bonding points.

19. A nonwoven laminate according to claim 18, wherein the thermoplastic fiber layer is made of spunbond fibers selected from the group consisting of polyester and polypropylene fibers.

20. A nonwoven laminate according to claim 18, wherein the core layer comprises paper fibers with a binder.

21. A nonwoven laminate according to claim 18, wherein the core layer comprises a mixture of cellulose and polymeric fibers without a binder.

22. A nonwoven laminate according to claim 18, wherein said core layer comprises polyester fibers making up about 40% or more of the fiber content of the core layer.

23. A nonwoven laminate according to claim 18, wherein the core layer comprises a mixture of cellulose and polymeric fibers treated with a fluorocarbon compound to form a tissue-type core layer.

24. A method of making a nonwoven laminate having a barrier property comprising the steps of:
forming at least one fiber layer made of thermoplastic fibers;
forming a wet-laid fabric core layer made of a uniform distribution of cellulose fibers and polymeric fibers;
applying a water-repellent finish to said wet-laid fabric layer; and
bonding said at least one thermoplastic fiber layer and said wet-laid fabric layer together.

25. A method of making a nonwoven laminate according to claim 24, wherein a binder is added to said wet-laid fabric core layer.

26. A method of making a nonwoven laminate according to claim 24, wherein said first forming step includes forming two external layers of spunbond thermoplastic fibers, and said bonding step includes bonding said two external layers on each side of said wet-laid fabric layer.

27. A method of making a nonwoven laminate according to claim 24, wherein said bonding step includes ultrasonically bonding said layers together at a plurality of discrete bonding points.

28. A method of making a nonwoven laminate according to claim 24, wherein said finish-applying step includes dipping a continuous web of the wet-laid fabric layer in a padding mix containing a fluorocarbon compound, and squeeze padding said web for about 100% wet pick-up.

29. A method of making a nonwoven laminate according to claim 24, wherein said second forming step includes forming the wet-laid fabric layer to contain in the range of 20% to 60% cellulose fibers.

30. A method of making a nonwoven laminate according to claim 24, wherein said second forming step includes forming the wet-laid fabric layer to contain in the range of about 40% polyester fibers.

* * * * *